(12) United States Patent
Willassen et al.

(10) Patent No.: US 11,181,419 B2
(45) Date of Patent: Nov. 23, 2021

(54) PHOTON SENSING WITH THRESHOLD DETECTION USING CAPACITOR-BASED COMPARATOR

(71) Applicant: OmniVision Technologies, Inc., Santa Clara, CA (US)

(72) Inventors: Trygve Willassen, Oppegaard (NO); Olivier Bulteel, Oslo (NO); Trung Nguyen, Oslo (NO); Robert Johansson, Oslo (NO)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 623 days.

(21) Appl. No.: 16/155,616

(22) Filed: Oct. 9, 2018

(65) Prior Publication Data

US 2020/0109987 A1 Apr. 9, 2020

(51) Int. Cl.
*G01S 17/894* (2020.01)
*G01J 1/46* (2006.01)
(Continued)

(52) U.S. Cl.
CPC .............. *G01J 1/46* (2013.01); *G01J 1/4228* (2013.01); *G01S 7/4863* (2013.01);
(Continued)

(58) Field of Classification Search
CPC ...... G01J 1/46; G01J 1/4228; G01J 2001/442; G01J 2001/444; G01J 2001/4466;
(Continued)

(56) References Cited

U.S. PATENT DOCUMENTS 8,334,496 B2 * 12/2012 Guellec ................ G01S 7/4868
250/214 R
2011/0058153 A1 3/2011 Nieuwenhove et al.
(Continued)

FOREIGN PATENT DOCUMENTS

CN 1384349 A 12/2002
CN 1732574 A 2/2006
(Continued)

OTHER PUBLICATIONS (ROC) Taiwan Patent Application No. 108132610—Office Action with English Translation dated Jul. 2, 2020, 8 pages.
State Intellectual Property Office, First Office Action, dated Aug. 25, 2021, CN Patent Application No. 201910898419.6, 11 pages.

*Primary Examiner* — Que Tan Le
(74) *Attorney, Agent, or Firm* — Christensen O'Connor Johnson Kindness PLLC

(57) ABSTRACT

A threshold detection circuit includes a plurality of capacitors. A plurality of switching circuits is coupled to the capacitors such that a first end of each of the capacitors is coupled to a corresponding photon sensor during detection intervals, and the first end of each capacitor is coupled to a variable initialization value during reset intervals. A threshold number of the capacitors are initialized to a first value and the remaining capacitors are initialized to a second value during reset intervals. A comparator is coupled to a second of the capacitors to generate a detection event in response to the threshold number of photon sensors sensing one or more incident photons during detection intervals.

20 Claims, 6 Drawing Sheets

(51) Int. Cl.
    *G01J 1/42*            (2006.01)
    *G01S 17/08*         (2006.01)
    *G01S 7/4865*       (2020.01)
    *G01S 7/4863*       (2020.01)
    *G01J 1/44*            (2006.01)

(52) U.S. Cl.
    CPC ............ *G01S 7/4865* (2013.01); *G01S 17/08* (2013.01); *G01J 2001/442* (2013.01); *G01J 2001/4466* (2013.01)

(58) Field of Classification Search
    CPC ...... G01S 7/4863; G01S 17/08; G01S 7/4865; G01S 17/894
    USPC ................. 250/214 R, 214 AL, 214.1, 208.1
    See application file for complete search history.

(56) References Cited

U.S. PATENT DOCUMENTS

| | | |
|---|---|---|
| 2016/0003674 A1 | 1/2016 | Sanson |
| 2016/0054447 A1 | 2/2016 | Sun et al. |
| 2016/0240579 A1 | 8/2016 | Sun et al. |
| 2016/0282452 A1 | 9/2016 | Menashe et al. |
| 2017/0033777 A1 | 2/2017 | Kim et al. |
| 2017/0074976 A1 | 3/2017 | Takahashi et al. |

FOREIGN PATENT DOCUMENTS

| | | |
|---|---|---|
| CN | 105739584 A | 7/2016 |
| CN | 108291961 A | 7/2018 |

\* cited by examiner

PHOTON SENSING WITH THRESHOLD DETECTION USING CAPACITOR-BASED COMPARATOR

BACKGROUND INFORMATION

Field of the Disclosure

This disclosure relates generally to light sensors, and in particular but not exclusively, relates to photon sensors that can be used in long range time of flight applications.

Background

Interest in sensors that can sense distance is increasing as the popularity of three dimensional (3D) and ranging applications continues to grow in uses such as imaging, movies, games, computers, user interfaces, self-driving vehicles, and the like. A typical passive way to sense objects or 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require sensing objects, such as pedestrians, or the acquisition of 3D images in real time, active depth imaging systems based on the optical time of flight measurement are sometimes utilized. Time of flight systems typically employ a light source that directs light at an object, a sensor that detects the light that is reflected from the object, and a processing unit that calculates the distance to the object based on the round trip time that it takes for light to travel to and from an object. In typical time of flight sensors, photodiodes are often used because of the high transfer efficiency from the photo detection regions to the sensing nodes.

A continuing challenge with sensing objects and the acquisition of 3D images is that in long range applications, such as for example time of flight (TOF) light detection and ranging (LiDAR) applications, or the like, the large amounts of background light that exist outside during mid-day make it more difficult to the detect reflected light pulses due to the large amount of ambient light. In particular, because so many photons arrive each second it is difficult to detect such a weak TOF signal on top of a very large background signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
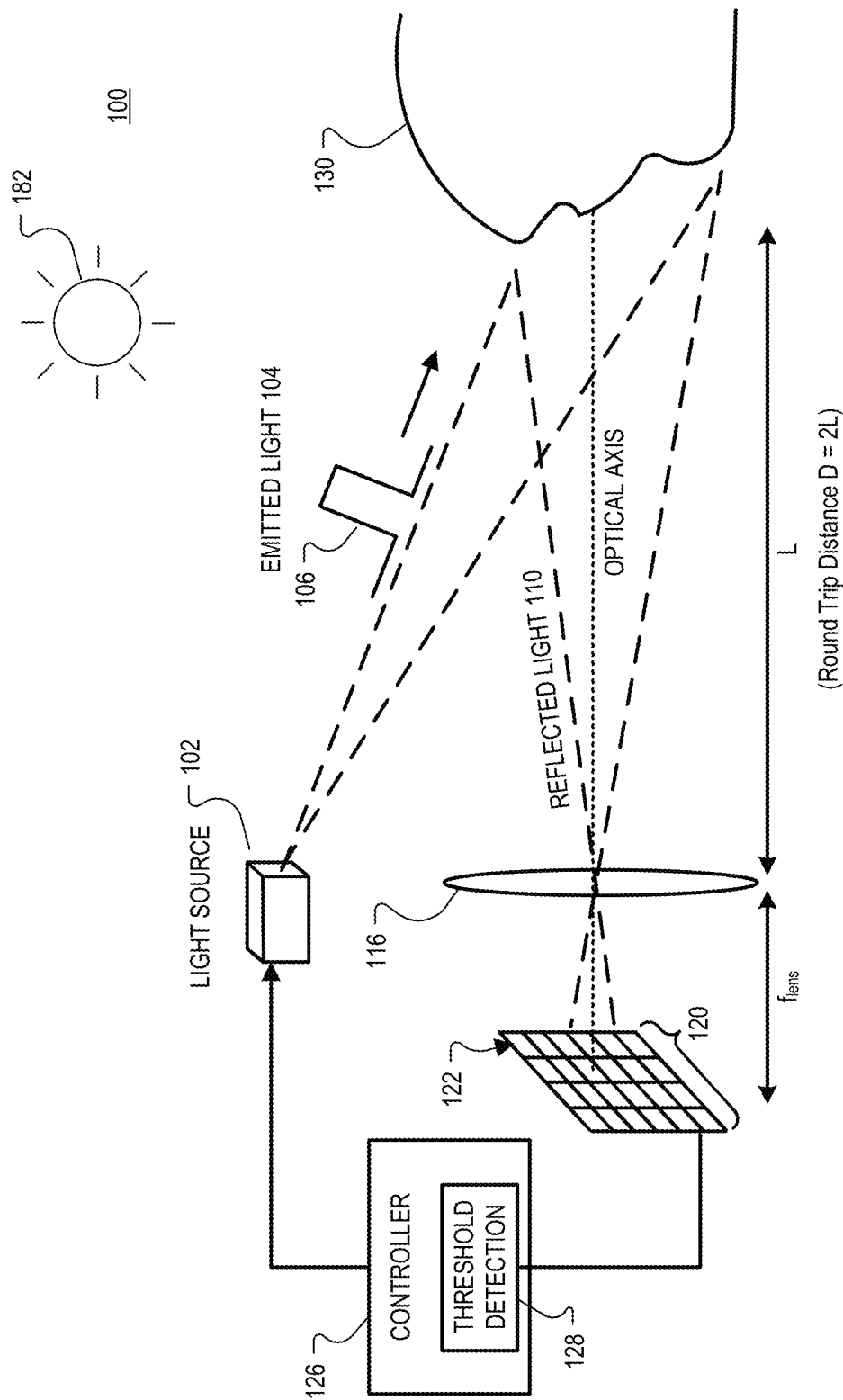
FIG. 1 is a block diagram that shows one example of a long range time of flight light sensing system with threshold detection including a capacitor-based comparator in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for sensing photons using a threshold detection circuit with a capacitor-based comparator that suitable for use in long range time of flight systems are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be shown, examples of a capacitor-based comparator included in a threshold detection circuit that may be used to sense photons in high ambient light conditions are disclosed. In the various examples, pixel cells that include one or more photon sensors per pixel, such as for instance Geiger-mode Single Photon Avalanche Diodes (SPADs), are included in the pixel arrays of a photon sensing systems. For LiDAR applications that are used for instance in self-driving vehicles, a major challenge is distinguishing a pedestrian among other objects when there is a lot of background light that could blind the image sensor. Consequently, the image sensor has to detect a weak signal (e.g., the correlated light return from a pedestrian) with a very high level of noise level (e.g., background light). In the various examples, a capacitor-based comparator included in a threshold detection circuit is used to measure return signals from the photon sensors, even in bright ambient light conditions, which make the disclosed examples of capacitor-based threshold detection suitable for use in long range time of flight applications such as LiDAR applications or the like in accordance with the teachings of the present invention.

To illustrate, FIG. 1 is a block diagram that shows one example of a long range time of flight light sensing system 100 with threshold detection including a capacitor-based comparator to detect objects in bright ambient light conditions in accordance with the teachings of the present invention. In particular, as shown in the depicted example, time of flight light sensing system 100 includes a light source 102, a lens 116, a pixel array 120 including a plurality of pixel cells 122, and a controller 126. Controller 126 is coupled to control operation of the light source 102 and the plurality of pixel cells 122 included in pixel array 120. In addition, controller 126 includes a threshold detection circuit 128, and may also be coupled to process the information that is readout from pixel array 120.

As shown in the example, the pixel array 120 is positioned at a focal length $f_{lens}$ from lens 116. In the example, light source 102 and lens 116 are positioned at a distance L from an object 130. It is appreciated that FIG. 1 is not illustrated to scale and that in one example the focal length $f_{lens}$ is substantially less than the distance L between lens 116 and object 130. Therefore, it is appreciated that for the purposes of this disclosure, the distance L and the distance L+focal length $f_{lens}$ are substantially equal for the purposes of time of flight measurements in accordance with the teachings of the present invention. As illustrated, pixel array 120 and controller 126 are represented as separate components for explanation purposes. However, it is appreciated that pixel array 120 and controller 126 may all be integrated onto a same stacked chip sensor. In other embodiments, pixel array 120 and controller 126 may be integrated onto a non-stacked standard planar sensor.

Furthermore, it is appreciated that the example pixel array 120 shown in FIG. 1 is illustrated as a two dimensional (2D) array of pixel cells 122 arranged into a plurality of rows and a plurality of columns. As such, it is appreciated that 2D pixel array 120 may be suitable for acquiring a 3D image of object 130. In another example, it is appreciated that pixel array 120 may also be implemented as a one dimensional array of pixel cells 122, which can be useful in other applications, in accordance with the teachings of the present invention. Furthermore, in yet another example, it is appreciated that if pixel array 120 may also be included in light sensing systems that do not require time of flight measurements, and in such systems, a light source 102 is not required.

Referring back to the example depicted in FIG. 1, time of flight light sensing system 100 is a 3D camera that calculates depth information to detect an object 130 (e.g., a pedestrian) based on time of flight measurements with pixel array 120. Time of flight light sensing system 100 may even operate in conditions with bright ambient light 182 (e.g., bright sunlight at mid-day), and each pixel cell 122 in pixel array 120 can determine depth information for a corresponding portion of object 130 such that a 3D image or range information regarding object 130 can be generated. The range or depth information is determined by measuring a round-trip time for light to propagate from light source 102 to object 130 and back to time of flight light sensing system 100.

As illustrated, light source 102 (e.g., a vertical-cavity surface-emitting laser) is configured to emit light 104, including light pulses 106, to object 130 over a distance L. Emitted light 104 is then reflected from object 130 as reflected light 110, some of which propagates towards time of flight light sensing system 100 over a distance L and is incident upon pixel array 120 as image light. Each pixel cell 122 in pixel array 120 includes one or more photon sensors (e.g., one or more SPADs) to detect the image light and convert the image light into an output signal.

As shown in the depicted example, the round-trip time for pulses (e.g., pulses 106) of the emitted light 104 to propagate from light source 102 to object 130 and back to plurality of pixels 120 can be used to determine the distance L using the following relationships in Equations (1) and (2) below:

$$T_{TOF} = \frac{2L}{c} \quad (1)$$

$$L = \frac{T_{TOF} \times c}{2} \quad (2)$$

where c is the speed of light, which is approximately equal to $3 \times 10^8$ m/s, and $T_{TOF}$ corresponds to the round-trip time which is the amount of time that it takes for pulses of the light 106 to travel to and from the object 130 as shown in FIG. 1. Accordingly, once the round-trip time is known, the distance L may be calculated and subsequently used to determine depth information of object 130.

As shown in the illustrated example, controller 126 is coupled to control pixel array 120 (including pixel cells 122) and light source 102, and includes logic that when executed causes time of flight light sensing system 100 to perform operations for determining the round-trip time. Determining the round-trip time may be based on, at least in part, timing signals generated by a time-to-digital converter. The timing signals are representative of when light source 102 emits light and when the pixel cells 122 detect the image light.

Figure 2A:
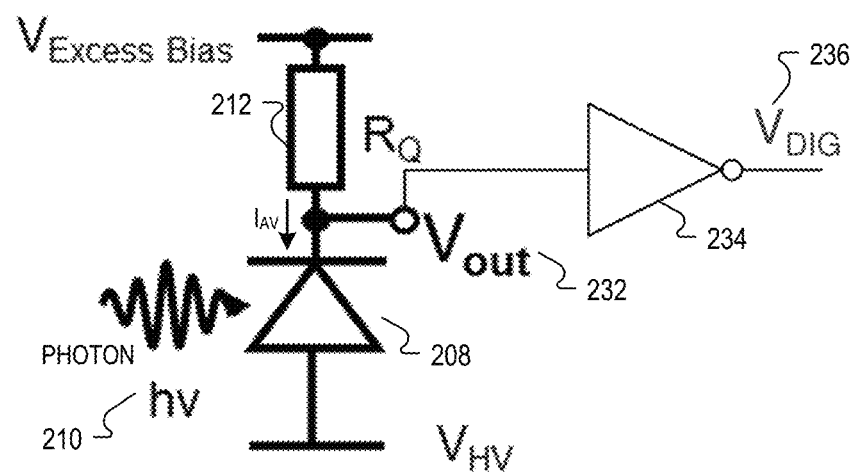
FIG. 2A is a schematic diagram that shows an example photon sensor included in a pixel cell that may be included in the time of flight light sensing system with threshold detection including a capacitor-based comparator in accordance with the teachings of the present invention.

FIG. 2A is a schematic diagram that shows an example photon sensor 208 included in a pixel cell that may be included in the time of flight light sensing system with threshold detection including a capacitor-based comparator in accordance with the teachings of the present invention. It is appreciated that the portion of the pixel cell illustrated in FIG. 2A may be one example of one of the plurality of pixel cell 122 included for example in pixel array 120 of FIG. 1, and that similarly named and numbered elements referenced below are therefore coupled and function similar to as described above. As shown in the depicted example, the portion of the pixel cell illustrated in FIG. 2 includes a photon sensor 208 coupled to detect an incident photon 210 (also labeled "hv"). In one example, photon sensor 208 includes a Geiger-mode (GM) Single Photon Avalanche Photodiode (SPAD) coupled between a quenching circuit 212 and a voltage $V_{HV}$ (which in one example may be approximately −30 volts). In the depicted example, the incident photon 210 is adapted to trigger an avalanche current $I_{AV}$ in the photon sensor 208, causing a corresponding voltage spike in an output voltage signal $V_{OUT}$ 232 in response to the photon sensor 208 detecting the incident photon 210. Quenching circuit 212 (also labeled "$R_Q$") is coupled between a voltage $V_{Excess\ Bias}$ (which in one example may be approximately 3 volts) and the photon sensor 208 to quench the avalanche current $I_{AV}$, causing the output voltage signal $V_{OUT}$ 232 to be reset. In an example in which a digital output is desired, an inverter 234 may be coupled to receive $V_{OUT}$ 232 to produce digital output $V_{DIG}$ 236.

Figure 2B:
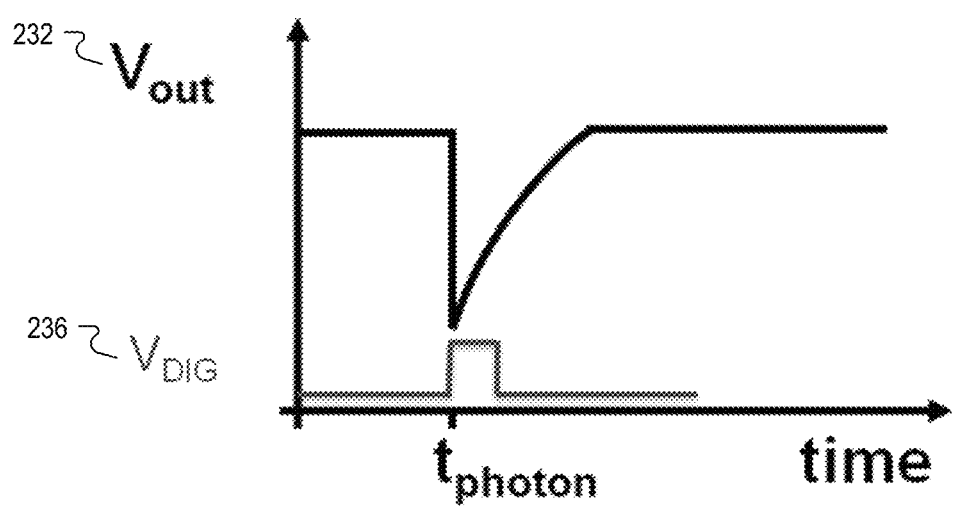
FIG. 2B is a timing diagram that shows an example output voltage and an example digital output of a photon sensor that may be included in the time of flight light sensing system with threshold detection including a capacitor-based comparator in accordance with the teachings of the present invention.

To illustrate, FIG. 2B is a timing diagram that shows an example of output voltage $V_{OUT}$ 232 and an example digital output $V_{DIG}$ 236 of a photon sensor 208 that may be included in the time of flight light sensing system with threshold detection including a capacitor-based comparator in accordance with the teachings of the present invention. In the depicted example, photon sensor 208 is a SPAD that is biased around its avalanche point to catch photons. When photon sensor 208 is properly biased in Geiger mode (with reverse voltage above the avalanche breakdown value), it waits for a charge to enter its internal electrical field and trigger an avalanche, which occurs at time $t_{photon}$ in FIG. 2B. Each avalanche generates a pulse. In one example, since the SPAD photon sensor 208 has an inner jitter <100 ps, SPADs can be used by photon sensor 208 to time measurements with high precision in accordance with the teachings of the present invention.

Figure 3:
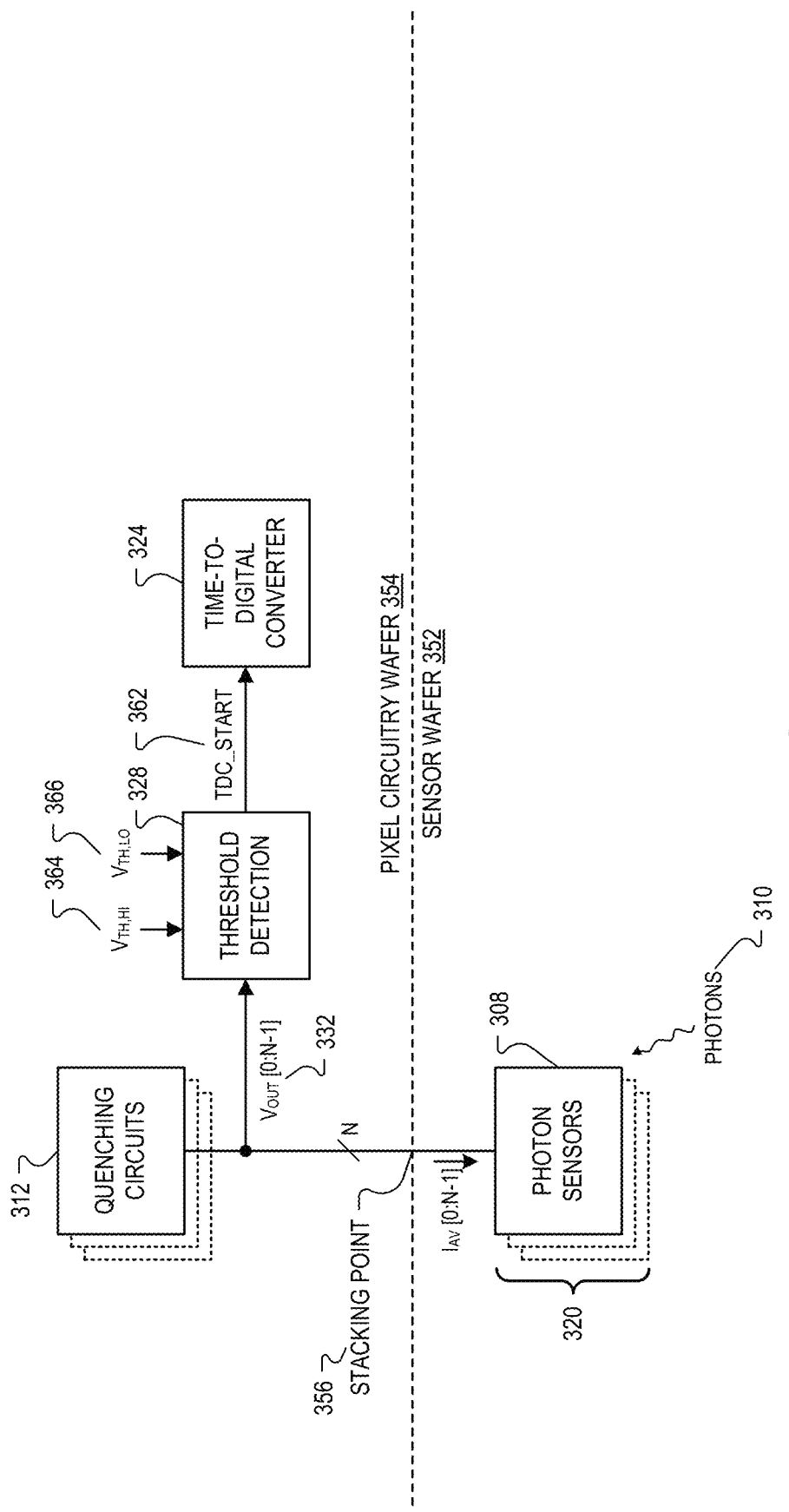
FIG. 3 is a functional block diagram that shows an example of a stacked pixel cell including photons sensors that may be included in the time of flight light sensing system with threshold detection including a capacitor-based comparator in accordance with the teachings of the present invention.

FIG. 3 is a functional block diagram that shows an example of a stacked pixel cell including photons sensors 308 of a pixel array 320 that may be included in the time of flight light sensing system with threshold detection including a capacitor-based comparator in accordance with the teachings of the present invention. It is appreciated that the photon sensors 308 illustrated in FIG. 3 may be one example of one of the photon sensors included in the pixel cells described above in FIGS. 1 and 2A-2B, and that similarly named and numbered elements referenced below are therefore coupled and function similar to as described above.

As shown in the depicted example, photon sensors 308 of pixel array 320 are coupled to detect incident photons 310. In the illustrated example, it is assumed that pixel array 320 includes a total of N number of photon sensors 308, which may be numbered from 0 to N−1 for purposes of discussion. Thus, in one example, it is assumed that N=1,058 such that there are 1,058 photon sensors in the pixel array 320. In one example, each photon sensor 308 is a Geiger-mode (GM) Single Photon Avalanche Photodiode (SPAD) such that an incident photon 310 is adapted to trigger an avalanche current $I_{AV}$[0:N−1] in the corresponding photon sensor 308, causing a voltage spike in the corresponding output voltage signal $V_{OUT}$[0:N−1] 332 in response to the photon sensor 308 detecting the incident photon 310. Thus, each quenching circuit 312 is coupled to a corresponding photon sensor 308 to quench the corresponding avalanche current $I_{AV}$[0:N−1], causing the corresponding output voltage signal $V_{OUT}$[0:N−1] 332 to be reset.

In one example, the photon sensors 308 are disposed in a first wafer 352, such as a sensor wafer, and the other pixel support circuitry, such as quenching circuits 312, threshold detection circuit 328, and time-to-digital converter 324, are disposed in a separate second wafer 354, such as a pixel circuitry wafer, which is stacked with the first wafer 352 in a stacked chip scheme. In another example, it is appreciated that the quenching circuits 312 may be included in first wafer 352. In the example depicted in FIG. 3, the photon sensors 308 in first wafer 352 are coupled to corresponding quenching circuits 312 in the second wafer 354 through a stacking point 356 at the interface between the first wafer 352 and the second wafer 354. As such, it is appreciated that the pixel cells are implemented using stacking technology, which provides the additional benefit of no fill factor or light sensitivity penalty for the pixel circuitry included to support operation of the pixel cell in accordance with the teachings of the present invention.

As shown in the depicted example, threshold detection circuit 328 includes a first input coupled to receive the output voltage signals $V_{OUT}$[0:N−1] 332 from the photon sensors 308. In one example, the threshold detection circuit 328 also includes inputs to receive references $V_{TH,HI}$ 364 and $V_{TH,LO}$ 366, which as will be described in greater detail below may be used to initialize a plurality of capacitors that are included in threshold detection circuit 328 during reset intervals in accordance with the teachings of the present invention.

In operation, threshold detection circuit 328 senses the output voltage signals $V_{OUT}$[0:N−1] 332 from the photon sensors 308 and generates a start signal TDC_START 362 in response to a threshold number of M photon sensors 308 detecting photons 310 in a particular frame. For instance, in one example under automotive conditions, bright background light conditions (e.g., 182) will induce a large number of active SPADs in photon sensors 308, and a small number of signal SPADs in photon sensors 308 in pixel array 320. In such an example with the total number N=1,058 photon sensors in the pixel array, it is assumed that 5 photons are detected from a target object (e.g., a pedestrian), while the bright background light induces 698 photons on average (e.g., from the bright sunlight). Therefore, in such an example, the threshold M can be set to M=700. It is appreciated of course that the example pixel array of a total number of N=1,058 photon sensors and the threshold of M=700 are illustrated here for explanation purposes, and that in other examples, a pixel array may include a different number N of photon sensors and a different threshold M can also be selected in accordance with the teachings of the present invention.

In operation, when no pedestrian is detected, 698 photon sensors 308 detect photons 310 due to the bright background light, which is less than the threshold of M=700. Accordingly, TDC_START 362 will not be triggered. However, when a pedestrian is detected an additional 5 photon sensors 308 will detect photons 310, on top of the other 698 photon sensors 308 that detect photons 310 due to the bright sunlight, which results in 698+5=703 photon sensors 308 being triggered. Since 703 is greater a greater number than the threshold of M=700 in this example, the start signal TDC_START 362 is triggered by threshold detection circuit 328 in accordance with the teachings of the present invention.

A time-to-digital converter circuit 324 is coupled to receive the start signal TDC_START 362 from threshold detection circuit 328. In one example, the time-to-digital converter circuit 324 is coupled to process time in response to at least the threshold number (e.g., M=700) of photon sensors 308 detecting photons 310. In one example, determining the round-trip time may be based on, at least in part, timing signals generated by time-to-digital converter circuit 324. For instance, in one example, the timing signals are representative of when light source (e.g., 102) emits light and when the photon sensors 308 detect the incident photons 310.

Figure 4A:
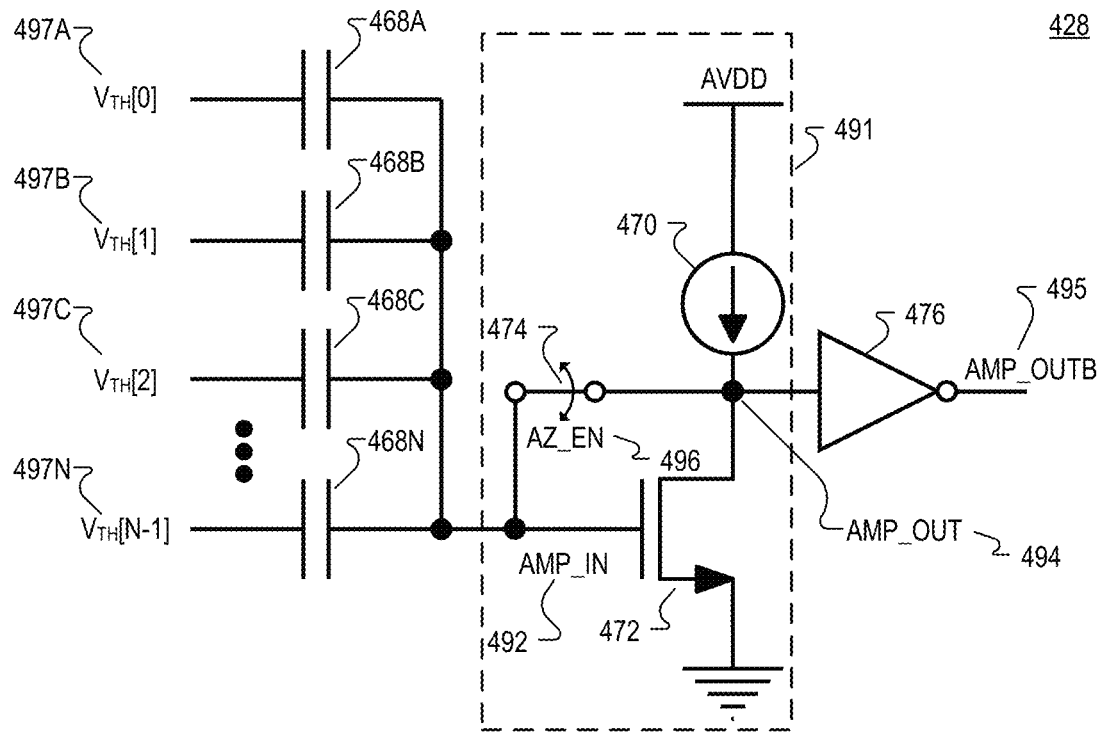
FIG. 4A is a schematic diagram that shows an example of a threshold detection circuit with a capacitor-based comparator during a reset interval in accordance with the teachings of the present invention.

FIG. 4A is a schematic diagram that shows an example of a portion of a threshold detection circuit 428 including a capacitor-based comparator 491 during a reset interval in accordance with the teachings of the present invention. It is appreciated that the portion of the threshold detection circuit 428 illustrated in FIG. 4A may be included in a photon sensing system and may be one example of the threshold detection circuit 128 included for example in controller 126 of FIG. 1, or one example of the threshold detection circuit 328 included for example in the stacked pixel cell of FIG. 3, and that similarly named and numbered elements referenced below are therefore coupled and function similar to as described above.

As shown in the depicted example, the threshold detection circuit 428 includes a plurality of capacitors including capacitors 468A, 468B, 468C, . . . 468N. In one example, there are N number of capacitors, with each capacitor coupled to a corresponding one of the plurality of photon sensors in the pixel array. For instance, in the example discussed above where there are N=1,058 photon sensors in the pixel array, there are N=1,058 capacitors included in the plurality of capacitors 468A, 468B, 468C, . . . 468N. Each one of the capacitors 468A, 468B, 468C, . . . 468N includes a first end and a second end. During a reset interval, the first end of each one of the capacitors 468A, 468B, 468C, . . . 468N is coupled to a respective variable initialization value $V_{TH}[0], V_{TH}[1], V_{TH}[2], \ldots V_{TH}[N-1]$ through a respective switching circuit, which will be discussed in further detail below.

In one example, the variable initialization values $V_{TH}[0:N-1]$ can be a first value (e.g., a "high" value) or a second value (e.g., a "low" value). For instance, continuing with the example discussed above in which there are a total of N=1,058 photon sensors and if the threshold number is M=700, then a threshold number (M=700) capacitors 468A, 468B, 468C, . . . 468N are initialized to receive the "high" value during a reset interval, and the remaining capacitors (N-M=1,058-700=358) are initialized to receive the "low" value during the reset interval. Thus, in this example with M=700, $V_{TH}[0:699]$="1" and $V_{TH}[700:1,057]$="0".

As shown in the depicted example, threshold detection circuit 428 also includes a comparator 491 that includes an input AMP_IN 492 and an output AMP_OUT 494. In the depicted example, the input AMP_IN 492 is coupled to the second end of each of the capacitors 468A, 468B, 468C, . . . 468N, as shown. In the example shown in FIG. 4A, the comparator 491 is a single stage open-loop comparator 491 that includes a current source 470 coupled to a transistor 472, with a reset switch 474 coupled between a control terminal (e.g., a gate terminal) of the transistor 472 and the output AMP_OUT 494 (e.g., at the drain terminal of transistor 472). In one example, an inverter 476 may also be coupled to the output AMP_OUT 494 of the comparator 491 to generate an inverted output of the comparator 491, which is labeled AMP_OUTB 495. In the depicted example, the reset switch 474 is closed (e.g., turned "on") during a reset interval in response to the reset signal AZ_EN 496.

Figure 4B:
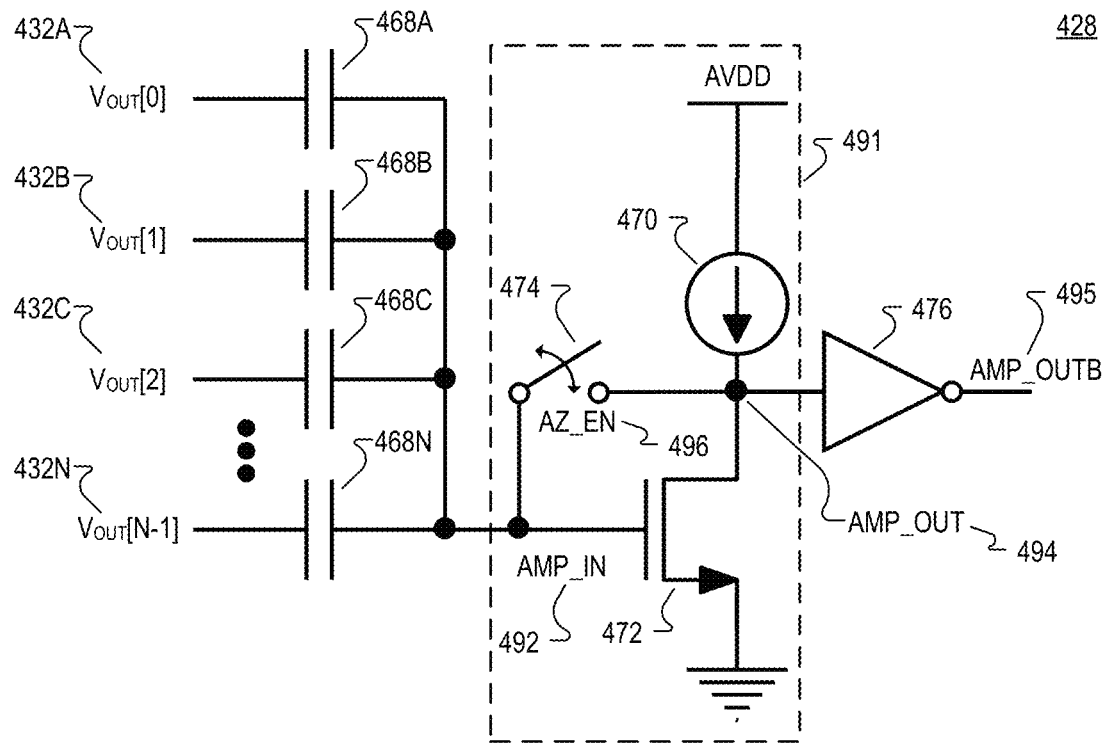
FIG. 4B is a schematic diagram that shows an example of a threshold detection circuit with a capacitor-based comparator during a detection interval in accordance with the teachings of the present invention.

FIG. 4B is a schematic diagram that shows an example of the threshold detection circuit 428 during a detection interval in accordance with the teachings of the present invention. It is appreciated that the portion of the threshold detection circuit 428 illustrated in FIG. 4B is substantially similar to the threshold detection circuit 428 shown in FIG. 4A, and that similarly named and numbered elements referenced below are therefore coupled and function similar to as described above. In particular, the example illustrated in FIG. 4B shows threshold detection circuit 428 during a detection interval, such that the reset switch 474 is opened (e.g., turned "off") during a detection interval in response to the reset signal AZ_EN 496. In addition, during the detection interval (e.g., a peak detection phase), the first end of each one of the capacitors 468A, 468B, 468C, . . . 468N is coupled to receive a respective output signal $V_{IN}[0], V_{IN}[1], V_{IN}[2], \ldots V_{IN}[N-1]$ from each photon sensor (e.g., the back plate of each SPAD), through the respective switching circuit.

In the example, the comparator 491 is coupled generate a detection event at AMP_OUT 494 in response to at least a threshold number of photon sensors sensing one or more incident photons during the detection intervals. For instance, in the example of the total of N=1,058 photon sensors and the threshold M=700, 700 of the photon sensors were initialized with $V_{TH}[0:699]$="1", and the remaining N–M photon sensors were initialized with $V_{TH}[700:1,057]$="0". As such, when:

$$\text{SUM}(V_{IN}[0:N-1]) > \text{SUM}(V_{TH}[0:N-1]), \quad (3)$$

the output AMP_OUT 494 of the comparator 491 is "flipped," which indicates a detection event of at least a threshold number of photon sensors sensing photons in accordance with the teachings of the present invention. In other words, assuming at least a threshold number of M=700 photon sensors (e.g., SPADs) detect a photon at the same time or in the same frame, a detection event is generated at AMP_OUT 494 in accordance with the teachings of the present invention. However, if no object is detected, then less than the threshold number of M=700 photon sensors will detect photons in the same frame, and no detection event is generated at AMP_OUT 494 in accordance with the teachings of the present invention.

Figure 5:
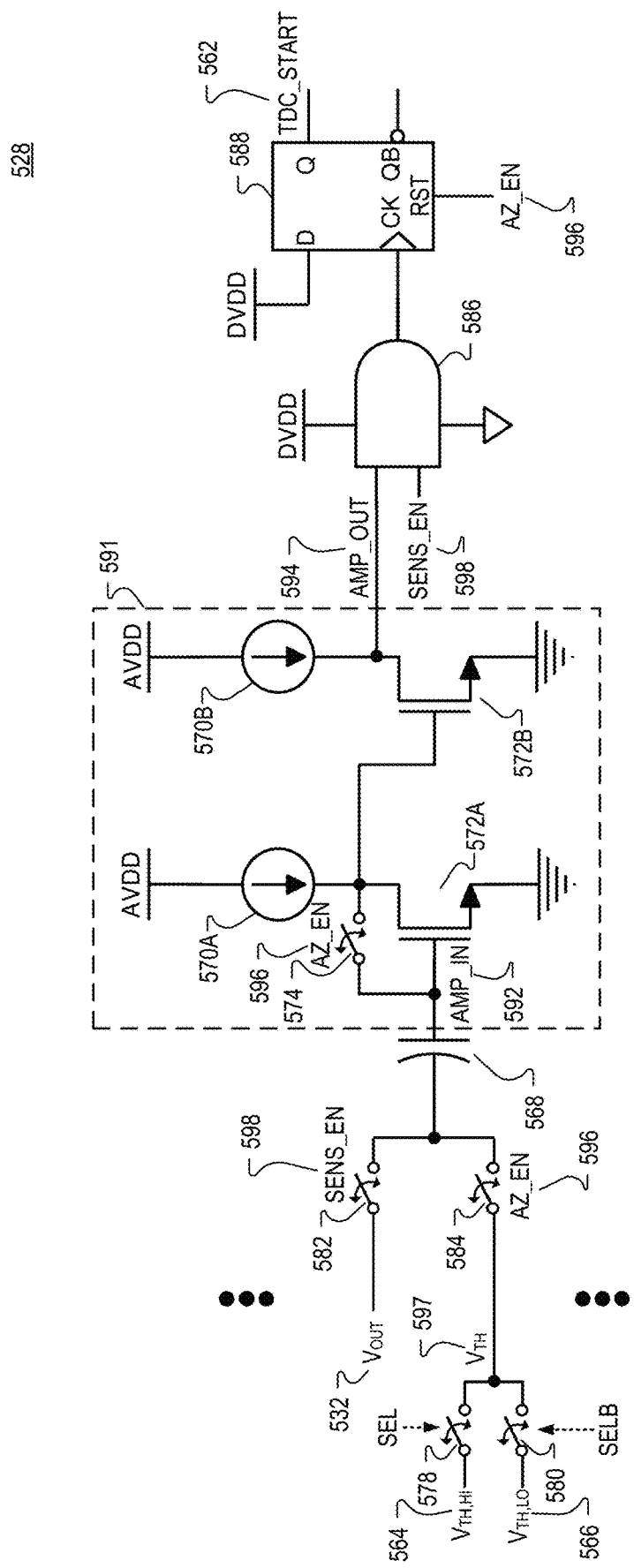
FIG. 5 is a schematic diagram that shows another example of a threshold detection circuit with a capacitor-based comparator in accordance with the teachings of the present invention.

FIG. 5 is a schematic diagram that shows another example of a portion of a threshold detection circuit 528 with a capacitor-based comparator 591 in accordance with the teachings of the present invention. It is appreciated that the portion of the portion of the threshold detection circuit 528 illustrated in FIG. 5 may be included in a photon sensing system and may be one example of the threshold detection circuit 128 included for example in controller 126 of FIG. 1, or one example of the threshold detection circuit 328 included for example in the stacked pixel cell of FIG. 3, or one example of the threshold detection circuit 428 shown in FIGS. 4A-4B, and that similarly named and numbered elements referenced below are therefore coupled and function similar to as described above.

It is also noted that the example threshold detection circuit 528 illustrated in FIG. 5 also shares many similarities with threshold detection circuit 428 shown in FIGS. 4A-4B. However, one difference with the threshold detection circuit 528 example shown in FIG. 5 is that one capacitor 568 is illustrated for the sake of brevity, which corresponds to one of the plurality of capacitors 468A, 468B, 468C, . . . 468N shown in FIGS. 4A-4B. As such, the first end of capacitor 568 is coupled to are respective one of a plurality of switching circuits, each one including for example switches 578, 580, 582, and 584 as shown. In operation, switch 582 is closed (e.g., turned "on") in response to a SENS_EN 598 signal during detection intervals (e.g., peak detection phases), and opened (e.g., turned "off") when it is not a detection interval. Similarly, switch 584 is closed (e.g., turned "on") in response to an AZ_EN 596 signal during reset intervals, and opened (e.g., turned "off") when it is not a reset interval. As shown in greater detail below, in one example, the AZ_EN 596 and the SENS_EN 598 signals are non-overlapped signals such that only one of the two signals can be "on" at a time. In addition, in one example there is also a slight delay between the detection intervals and the reset intervals such that there is a "dead time" when both signals are off simultaneously between the signals being turned on to avoid race conditions when transitioning between the reset and detection intervals.

In operation when the switch 582 is closed and switch 584 is opened during a detection interval, the first end of capacitor 568 is coupled to receive the input voltage $V_{OUT}$ 532 generated from a respective one of the photon sensors (e.g., generated by the SPAD front end in response to detected photons).

When the switch 582 is opened and switch 584 is closed during a reset interval, the first end of capacitor 568 is coupled to be initialized with a variable threshold signal $V_{TH}$ 597 through switch 580 or switch 578, respectively as shown, which is either a "low" initialization value $V_{TH,LO}$ 566, or a "high" initialization value $V_{TH,HI}$ 564. In the depicted example, either the "low" initialization value $V_{TH,LO}$ 566 or the "high" initialization value $V_{TH,HI}$ 564 is selected through switch 580 or switch 578, respectively, in response a select signal SEL or an inverted select signal SELB as shown.

Another difference with the threshold detection circuit 528 example shown in FIG. 5 is that the example comparator 591 is a two stage open-loop comparator, having an input AMP_IN 592 and an output AMP_OUT 594. In the depicted example, the input AMP_IN 592 is coupled to the second end of each of the plurality of capacitors, including the capacitor 568 shown in FIG. 5. It is appreciated that the amplifier of comparator 591 does not necessarily need two stages, and that a similar solution can be implemented with a single stage amplifier and inversed polarity at the output. The first stage of the two stage open-loop comparator 591 example shown in FIG. 5 includes a current source 570A coupled to a transistor 572A, with a reset switch 574 coupled between a control terminal (e.g., a gate terminal) of the transistor 572 and the drain terminal of transistor 572. The second stage of the two stage open-loop comparator 591 example shown in FIG. 5 includes a current source 570B coupled to a transistor 572B, with the gate terminal of transistor 572B coupled to the drain terminal of transistor 572A, and the output AMP_OUT 594 coupled to generated at the drain terminal of transistor 572B as shown. In the depicted example, the reset switch 574 is closed (e.g., turned "on") during a reset interval in response to the reset signal AZ_EN 596, and the switch 574 is opened (e.g., turned "off") during a detection interval in response to the reset signal AZ_EN 596.

As shown in the example illustrated in FIG. 5, threshold detection circuit 528 also includes a flip-flop 588 that is coupled to be clocked in response the comparator 591 generating the detection event at AMP_OUT 594. As shown in the depicted example, flip-flop 588 includes a data input D that is tied to a voltage source DVDD, and a Q output from which the start signal TDC_START 562 is generated. As mentioned previously, the start signal TDC_START 562 is coupled to be received by a time-to-digital converter (e.g., 324) to process time in response to at least the threshold number of photon sensors sensing the one or more incident photons during the detection intervals in accordance with the teachings of the present invention. In the depicted example, the clocking of flip-flop 588 is enabled during the sensing interval. As such, as shown in the depicted example, an AND 568 that is gated in response to the SENS_EN 598 signal is coupled between the clock input of flip-flop 588 and the output AMP_OUT 594 of the comparator 591. Thus, the flip-flop 588 is disabled from being clocked when it is not a sensing interval, and is reset after the sensing interval. As shown in the depicted example, flip-flop 588 includes an asynchronous reset input RST that is active high, and is coupled to receive the reset signal AZ_EN 596. Thus, when whenever the reset signal AZ_EN 596 is asserted (e.g., logic high), flip-flop 588 will be reset asynchronously, meaning that the Q output of flip-flop 588 (i.e., TDC_START 562) will immediately be de-asserted (e.g., logic low) when the reset signal AZ_EN 596 is asserted.

Figure 6:
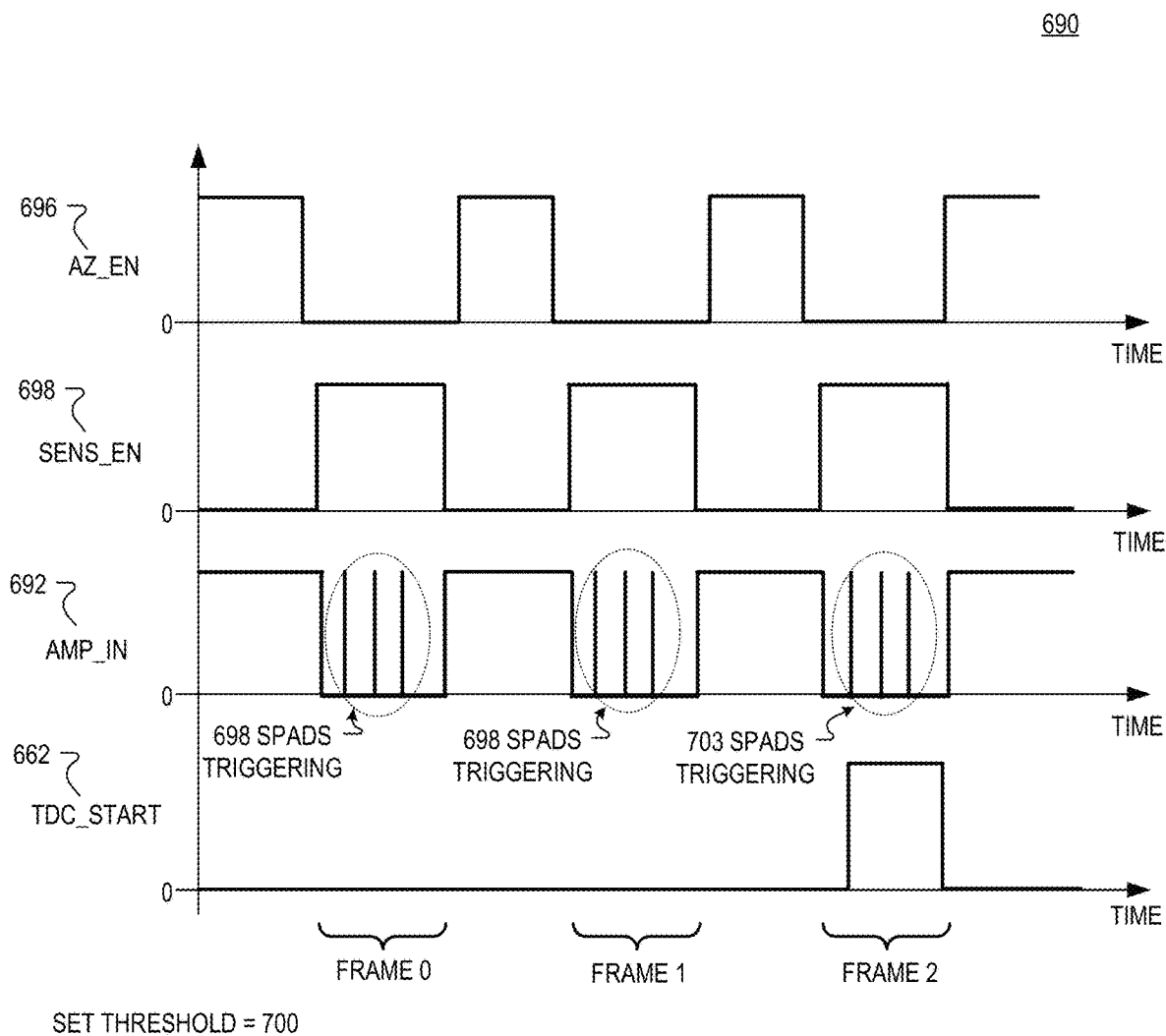
FIG. 6 is a timing diagram that illustrates the relationship of signals that may be found in an example threshold detection circuit with a capacitor-based comparator included time of flight light sensing system in accordance with the teachings of the present disclosure.

FIG. 6 is a timing diagram 690 that illustrates the relationship of signals that may be found in an example threshold detection circuit with a capacitor-based comparator included time of flight light sensing system during operation in accordance with the teachings of the present disclosure. It is appreciated that the signals illustrated in FIG. 6 may be examples of signals found in for example threshold detection circuit 128 of FIG. 1, threshold detection circuit 328 of FIG. 3, threshold detection circuit 428 of FIGS. 4A-4B, or threshold detection circuit 528 of FIG. 5, and that similarly named and numbered elements referenced below are therefore coupled and function similar to as described above. In particular, FIG. 6 shows examples of an AZ_EN 696 signal, a SENS_EN 698 signal, an AMP_IN 692 signal, and a TDC_START 662 signal during operation of a threshold detection circuit in accordance with the teachings of the present invention.

The example depicted in FIG. 6 continues with the example discussed previously in which a pixel array includes a total of N=1,058 photon sensors in bright light, which causes 698 photon sensors to trigger due to the background light, and 5 additional photon sensors to trigger when an object, such as for example a pedestrian, is detected. As such, the threshold is set to M=700 in the example for explanation purposes.

In the depicted example, prior to FRAME 0, a reset phase occurs in the threshold detection circuit with AZ_EN 696 signal high and SENS_EN 698 signal low. During the reset phase, M of the photon sensors of the pixel array are initialized with $V_{TH}[0:M-1]$="1", and the remaining N-M photon sensors of the pixel array are initialized with $V_{TH}[M:N-1]$="0" as discussed above. As shown, the AZ_EN 696 signal and the SENS_EN 698 signal are non-overlapping signals and there is a delay while both signals are low before the AZ_EN 696 signal transitions to low and the SENS_EN 698 signal transitions to high for FRAME 0. In the depicted example, AMP_IN 692 shows that 698 photon sensors (e.g., also labeled "SPADS" in FIG. 6) are triggered due to the bright background light conditions. Since 698 photon sensors is less than the threshold of 700 in this example, no detection event occurs in FRAME 0, as indicted with the TDC_START 662 signal remaining low. Another reset interval occurs, and then in FRAME 1, 698 photon sensors are triggered, which is less than the threshold of 700, and as such no detection event occurs in FRAME 1, as indicted with the TDC_START 662 signal remaining low. Another reset interval occurs and then in FRAME 2, 703 photon sensors are triggered due to an additional 5 photon sensors being triggered due to an object being detected. Since 703 is greater than the threshold of 700, a detection event occurs in the AMP_OUT signal (e.g., 594), which causes the TDC_START 662 signal to pulse high indicating the sensing of an object by the photon sensing system in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A threshold detection circuit for use with a photon sensing system, comprising:
    a plurality of capacitors, wherein each one of the plurality of capacitors has a first end and a second end;
    a plurality of switching circuits, wherein each one of the plurality of switching circuits is coupled to the first end of one of the capacitors, wherein the plurality of switching circuits is configured to couple the first end of each one of the capacitors to a corresponding one of a plurality of photon sensors during detection intervals, wherein the plurality of switching circuits is configured to couple the first end of each one of the capacitors to a variable initialization value during reset intervals, wherein a threshold number of the plurality of capacitors are coupled to a variable initialization value having a first value during the reset intervals, and wherein a remaining number of the plurality of capacitors are coupled to a variable initialization value having a second value during the reset intervals; and
    a comparator circuit having an input coupled to the second end of each one of the plurality of capacitors, wherein the comparator circuit is coupled generate a detection event in response to the threshold number of photon sensors sensing one or more incident photons during the detection intervals.

2. The threshold detection circuit of claim 1, wherein an avalanche current is triggered each one of the plurality of photon sensors the one or more incident photons sensed during the detection intervals.

3. The threshold detection circuit of claim 2, wherein each one of the plurality of photon sensors comprises a Geiger-mode Single Photon Avalanche Photodiode (SPAD).

4. The threshold detection circuit of claim 1, wherein the comparator circuit comprises:
    a first current source;
    a first transistor coupled to the first current source, wherein the first transistor includes first and second terminals and a control terminal, wherein the control terminal of the first transistor is coupled to the input of the comparator, and the comparator circuit is coupled generate the detection event in response to the first terminal of the first transistor; and
    a switch coupled between the control terminal and the first terminal of the first transistor, wherein the switch is adapted to couple the control terminal of the first transistor to the first terminal of the first transistor during the reset intervals, and wherein the switch is adapted to decouple the control terminal of the first transistor from the first terminal of the first transistor during the detection intervals.

5. The threshold detection circuit of claim 4, wherein the comparator circuit is an open loop comparator.

6. The threshold detection circuit of claim 4, wherein the comparator circuit further comprises:
    a second current source; and
    a second transistor coupled to the second current source, wherein the second transistor includes first and second terminals and a control terminal, wherein the control terminal of the second transistor is coupled to the first terminal of the first transistor, and wherein the detection event is further coupled to be generated in response to the first terminal of the second transistor.

7. The threshold detection circuit of claim 1, wherein a time-to-digital converter is coupled to receive a start signal in response the comparator circuit generating the detection event.

8. The threshold detection circuit of claim 7, further comprising a flip-flop coupled to be clocked in response the comparator circuit generating the detection event, wherein the flip-flop is coupled to generate the start signal.

9. The threshold detection circuit of claim 8, wherein the flip-flop is disabled from being clocked when it is not a sensing interval.

10. The threshold detection circuit of claim 1, wherein the detection intervals and the reset intervals are non-overlapping.

11. The threshold detection circuit of claim 10, wherein there is a delay between the detection intervals and the reset intervals.

12. A photon sensing system, comprising:
    a plurality of photon sensors arranged in an array, wherein each one of the plurality of photon sensors is coupled to detect an incident photon, wherein the incident photon is adapted to trigger an avalanche current in the photon sensor;
    a plurality of quenching circuits coupled to the plurality of photon sensors, wherein each one of the plurality of quenching circuits is coupled to quench the avalanche current triggered in each one of the plurality of photon sensors; and
    a threshold detection circuit included in a controller coupled to the plurality of photon sensors, wherein the threshold detection circuit comprises:
        a plurality of capacitors, wherein each one of the plurality of capacitors has a first end and a second end;
        a plurality of switching circuits, wherein each one of the plurality of switching circuits is coupled to the first end of one of the capacitors, wherein the plurality of switching circuits is configured to couple the first end of each one of the capacitors to a corresponding one of a plurality of photon sensors during detection intervals, wherein the plurality of switching circuits is configured to couple the first end of each one of the capacitors to a variable initialization value during reset intervals, wherein a threshold number of the plurality of capacitors are coupled to a variable initialization value having a first value during the reset intervals, and wherein a remaining number of the plurality of capacitors are coupled to a variable initialization value having a second value during the reset intervals; and
a comparator circuit having an input coupled to the second end of each one of the plurality of capacitors, wherein the comparator circuit is coupled generate a detection event in response to the threshold number of photon sensors sensing one or more incident photons during the detection intervals.

13. The photon sensing system of claim 12, wherein plurality of photon sensors is disposed in a first wafer, and wherein the plurality of quenching circuits and the threshold detection circuit included in the controller are disposed in a second wafer that is stacked with the first wafer in a stacked chip scheme.

14. The photon sensing system of claim 12, further comprising a light source coupled to the controller, wherein the light source is coupled emit light towards an object such that the emitted light is reflected from the object to the plurality of photon sensors to determine a distance to the object from the plurality of photon sensors based on a time-of-flight of the light from the light source.

15. The photon sensing system of claim 12, further comprising:
a flip-flop coupled to be clocked in response the comparator circuit generating the detection event, wherein the flip-flop is coupled to generate a start signal; and
a time-to-digital converter is coupled to receive the start signal from the latch, wherein the time-to-digital converter circuit is coupled to process time in response the threshold number of photon sensors sensing the one or more incident photons during the detection intervals.

16. The photon sensing system of claim 15, wherein the flip-flop is disabled from being clocked when it is not a sensing interval.

17. The photon sensing system of claim 12, wherein an avalanche current is triggered each one of the plurality of photon sensors the one or more incident photons sensed during the detection intervals.

18. The photon sensing system of claim 12, wherein the comparator circuit comprises:
a first current source;
a first transistor coupled to the first current source, wherein the first transistor includes first and second terminals and a control terminal, wherein the control terminal of the first transistor is coupled to the input of the comparator, and the comparator circuit is coupled generate the detection event in response to the first terminal of the first transistor; and
a switch coupled between the control terminal and the first terminal of the first transistor, wherein the switch is adapted to couple the control terminal of the first transistor to the first terminal of the first transistor during the reset intervals, and wherein the switch is adapted to decouple the control terminal of the first transistor from the first terminal of the first transistor during the detection intervals.

19. The photon sensing system of claim 18, wherein the comparator circuit is an open loop comparator.

20. The photon sensing system of claim 18, wherein the comparator circuit further comprises:
a second current source; and
a second transistor coupled to the second current source, wherein the second transistor includes first and second terminals and a control terminal, wherein the control terminal of the second transistor is coupled to the first terminal of the first transistor, and wherein the detection event is further coupled to be generated in response to the first terminal of the second transistor.

\* \* \* \* \*